Aug. 24, 1937.     F. W. GAY     2,090,671
VOLTAGE REGULATOR
Filed Jan. 3, 1935     2 Sheets-Sheet 1

INVENTOR
Frazer W. Gay,
BY
George D. Richards
ATTORNEY

Aug. 24, 1937.  F. W. GAY  2,090,671

VOLTAGE REGULATOR

Filed Jan. 3, 1935   2 Sheets-Sheet 2

INVENTOR
Frazer W. Gay,
BY
George D. Richards
ATTORNEY

Patented Aug. 24, 1937

2,090,671

UNITED STATES PATENT OFFICE 2,090,671

VOLTAGE REGULATOR

Frazer W. Gay, Newark, N. J.

Application January 3, 1935, Serial No. 306

6 Claims. (Cl. 171—119)

This invention relates to a novel alternating current voltage regulator, and particularly to a voltage regulator which may very readily be altered so as to have its voltage regulating range and ampere capacity increased or decreased in accordance with the requirements of its associated feeder.

Voltage regulators are generally installed in substations having a plurality of feeders. When the substation is built these feeders generally number from four to six, increasing to twenty or more when the substation reaches its ultimate size. During the period of growth, as new feeders are added, the load is continually redistributed among the old feeders and the effective length of each feeder is thus continually changed. It follows therefore, that the minimum required regulating range of the voltage regulating equipment connected to each feeder is continually changing during the growth of the substation. The maximum expected load of each individual feeder is also continually being changed as the load is continually redistributed.

Voltage regulators as heretofore constructed have been, by design, of fixed voltage range and definite ampere capacity. They are heavy, solidly connected to their circuits, and generally have associated with them more or less complicated control circuits. If such heavy and expensive units were continually changed to suit the varying requirements of individual feeders, the expense of making each change would be great and the accumulation of expense for repeated changes would be exorbitant. Furthermore, so large a variety of sizes and ampere capacity regulators would be required that an excessive capital investment would be tied up in idle regulators to meet a possible large demand for a particular unit.

For the above reasons, users of voltage regulating equipment have generally determined in advance, both the maximum current each feeder in a given substation would ever be called upon to carry and the maximum voltage boost required on any feeder. Regulators are then purchased, each satisfying these maximum requirements. Such a standardization policy may be justified where losses diminish to zero in proportion to the square of the load carried. It is not justified in the case of the regulator equipment where relatively large constant losses are present and these constant losses vary, both with the current capacity and the voltage regulating range. Furthermore, many regulators have an excessive as well as substantially constant excitation demand.

A study of substations will show that in heavily loaded districts where substations are numerous and feeders short, the required buck and boost is about as follows. ¼ of the total feeders will require from 5% buck to 4% boost. ½ of the total feeders will require from 5% buck to 6% boost. ¼ of the total feeders will require from 5% buck to 8% boost.

In lightly loaded districts where feeders are long, about ¼ of the total feeders will require from 5% buck to 6% boost. ½ of the total feeders will require from 5% buck to 10% boost. ¼ of the total feeders will require from 5% buck to over 10% boost. One or two feeders generally require up to 20% boost.

For feeders requiring an excess of boost voltage over buck voltage, I propose to install in the regulator ½ of the excess of boost voltage in the form of permanent boost, so that an equal and minimum range of buck or boost will be required in the regulator.

It is to be noted that some manufacturers of regulators recommend carrying a low feeder voltage to utilize the full buck of the regulator and the setting of all transformers on the feeder on low taps to compensate. Under these conditions the voltage on long feeders is pulled down below what it should be, especially for maximum loads, and the feeder current is correspondingly increased. Regulation increases with current and the worst condition is made still worse.

It is the practice in many substations to install the substation equipment (O. C. B. and voltage regulators) of the maximum expected size, and to install feeder reactors of a size required by the feeder circuit and external to the regulator, so that during short circuit conditions the voltage regulator is subjected to both voltage and current.

I propose to install a current limiting reactor in each regulator, so connected that the regulator equipment cannot be simultaneously subjected to both maximum current and high voltage.

It is an object of my invention to provide a voltage regulating device composed of a plurality of substantially identical voltage regulating units which are brought successively into a buck or boost relation with the feeder circuit as required, each unit contributing a definite predetermined buck or boost.

It is a further object of my invention to connect only so many units in a feeder circuit as may be needed to give the instant required buck or boost. The remaining units not needed but provided for in the design may be short circuited, disconnected, or absent.

It is a further object of this invention to make all units readily interchangeable so that new units may readily be substituted of different ampere capacity. Or new units may be substituted of greater or lesser buck or boost capacity. Or damaged units may be promptly and cheaply replaced.

It is a further object of this invention to provide a regulating device comprising a plurality of regulating transformers and means to successively change connections of the primaries of said regulating transformers from a short circuited condition to a regulating condition or vice versa.

It is a further object of this invention to connect certain of the units in a voltage regulator in permanent boost relation for feeders requiring excessive boost, whereby the excessive and desired boost is obtained without a corresponding and useless buck voltage.

It is a further object of this invention to permanently incorporate in a voltage regulator a reactor so connected as to protect the regulator against the simultaneous occurrence of maximum current with substantially normal voltage.

It is a further object of this invention to switch capacitors into shunt across a circuit simultaneously with the regulating transformers whereby the power factor of the circuit may be continually adjusted to a desired or high value as an inductive load increases.

It is a further object of this invention to switch a great number of transformers into and out of an energized condition for regulating purposes; said great number of transformers allowing each transformer to have a large turn ratio and a correspondingly small current to be switched.

The invention is clearly illustrated in the accompanying drawings, in which.

Figure 1:
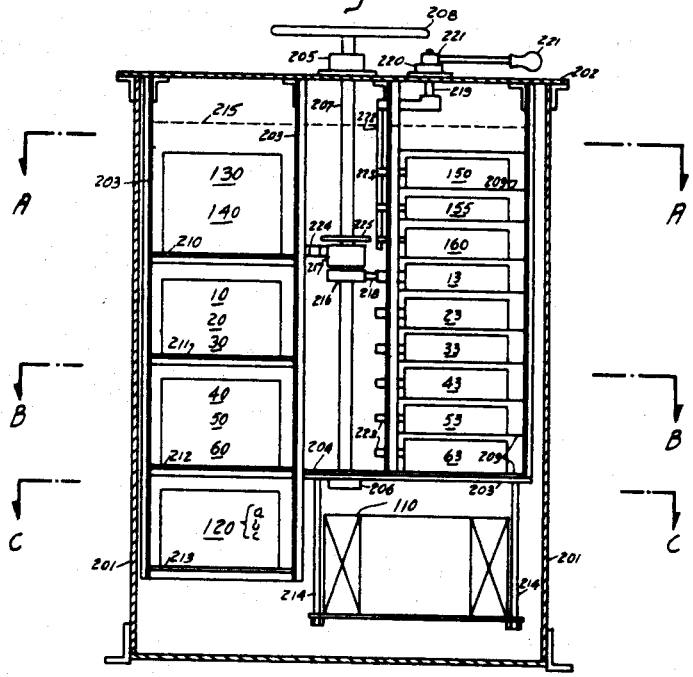
Fig. 1 is a cross section of a voltage regulator comprising the present invention.

In Fig. 1—201 represents a steel tank filled with oil to the level 215. Attached to the top or cover 202 is an angle iron rack 203 containing a plurality of racks 209, 209 etc. To each of these racks is attached a fast operating double throw switch commonly known to the trade as "snap over" type. These switches are numbered 150, 155, 160, 13, 23, 33, 43, 53 and 63. The upper three switches, i. e. 150, 155 and 160 are operated by rod 222 which engages the three switch handles 223. Rod 222 is actuated by a crank connected to operating handle 221 by shaft 219 journaled in bearing 220. The lower six switches, i. e. 13, 23, 33, 43, 53 and 63 are operated by the lug or finger 218 connected to revolving hub 216. Revolving hub 216 is moved up and down vertically by the nut 217 which is held against rotating by arm 224 and moves up and down vertically on threaded shaft 207. Threaded shaft 207 is held in journals 205 and 206 and operated by hand wheel 208. Nut 217 is stopped in its upward travel by stop plate 225.

Figure 2:
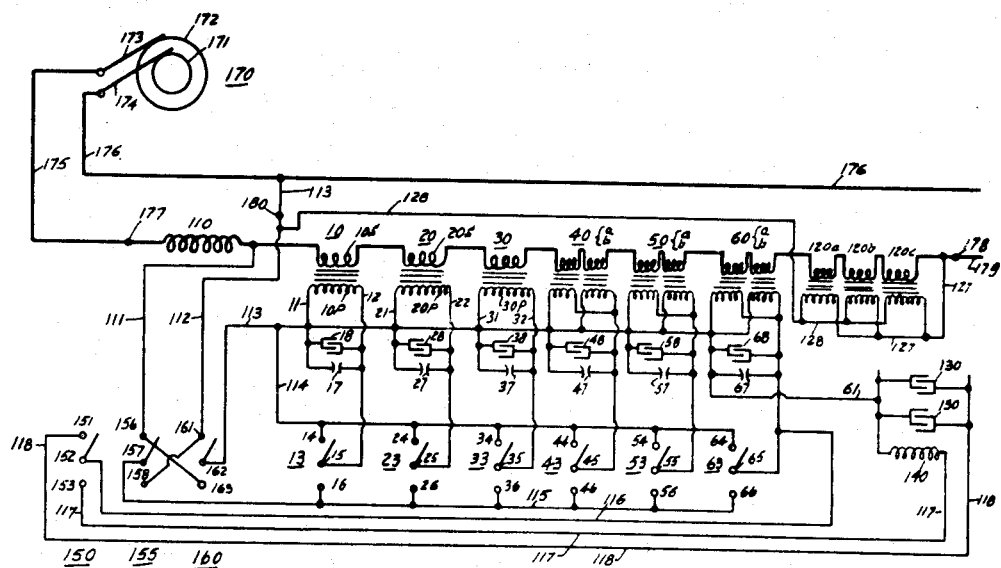
Fig. 2 is a diagrammatic representation of the regulator of Fig. 1.

On angle iron rack 203 are located the additional shelves 210, 211, 212 and 213 on which are mounted the various transformers, capacitors, lightning arrestors and reactors shown in Fig. 2.

Figure 3:
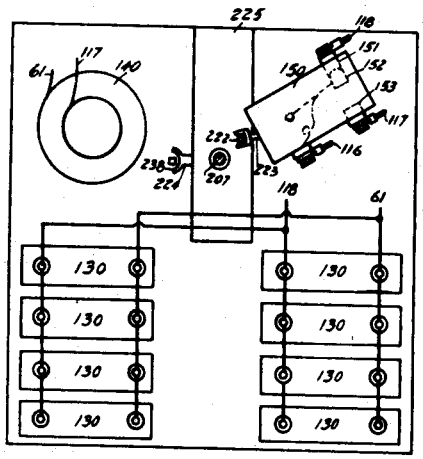
Fig. 3 is a cross section in plan along line AA Fig. 1.

Fig. 3 is a cross section in plan along line AA, Fig. 1 and shows the location of top "snap over" switch 150; the location of reactor 140 shunted across leads 61 and 117 (see Fig. 2); and the location of the two banks of capacitors shunted across leads 61 and 118 (see Fig. 2).

Figure 4:
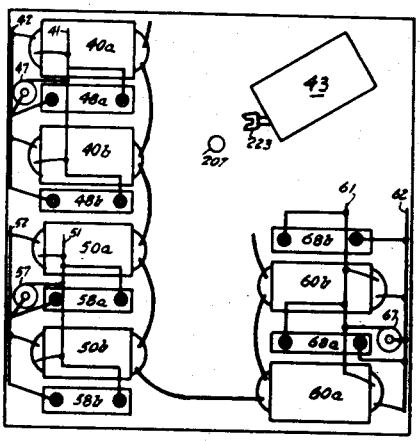
Fig. 4 is a cross section in plan along line BB Fig. 1.

Fig. 4 is a cross section in plan along line BB, Fig. 1 and shows transformers 40a and 40b with primaries shunted across leads 41 and 42, together with capacitors 48a and 48b and lightning arrestor 47 similarly connected. It also shows the location of the two similar banks of transformers 50a and 50b and 60a and 60b with their associated capacitors and lightning arrestors.

Figure 5:
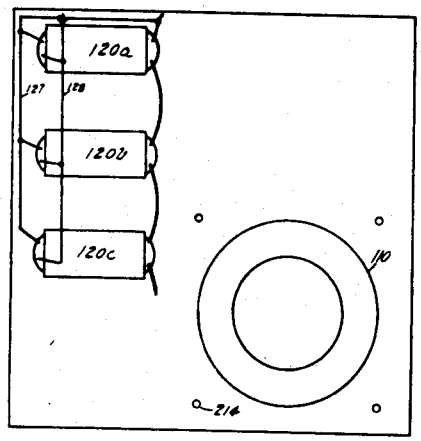
Fig. 5 is a cross section in plan along line CC Fig. 1.

Fig. 5 shows the location on shelf 213, Fig. 1 of the three transformers 120a, 120b, 120c. It also shows the location of reactor 110 (see Fig. 2).

All transformers shown in the above figures have their secondaries connected in series as shown in Fig. 2.

Figure 6:
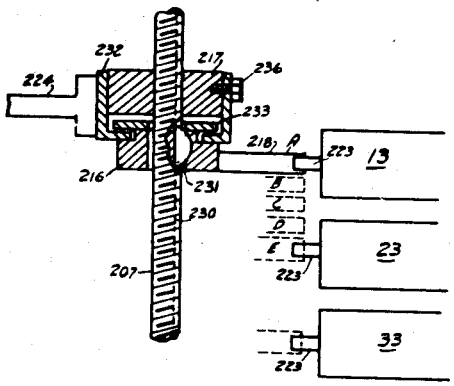
Fig. 6 shows an enlarged view of the switch operating mechanism of Fig. 1.

Fig. 6 shows an enlarged view of the operating nut 217 shown in Fig. 1. A key-way 230 is cut in the threaded shaft 207. Into this key-way is fitted a woodruff key 231 secured in the revolving hub 216 so that hub 216 and lug 218 revolve with shaft 207. With the nut in position shown in Fig. 6, swivel frame 232 is placed on top of hub 216 and swivel plate 233 is screwed to hub 216. Hub 216 with swivel frame 232 are now raised until lug 218 is in position to operate handle 223 of "snap over" switch 13 as shown. Swivel frame 232 is now attached to nut 217 by drilling, tapping, and applying set screw 236. Arm 224 has a clevis at its outer end 238 (see Fig. 3). Arm 224 is welded to swivel frame 232 so that swivel frame and nut 217 are held from revolving and travel up and down on shaft 207 as shaft 207 is rotated back and forth. As shaft 207 is rotated one revolution in the lowering direction, lug 218 makes one revolution and travels down from the position A to dotted position B. Lug 218 was in juxtaposition with operating handle 223 of switch 13 and operated switch 13 at the start of the first revolution. A second revolution brings lug 218 to position C. A third revolution brings lug 218 to position D and fourth to position E. Any further revolution of shaft 207 in this same direction will cause lug 218 to engage operating handle 223 of switch 23 and operate switch 23, etc.

The connections of the several parts of the device and their operation will be obvious to one skilled in the art by consulting Fig. 2. The feeder circuit wires 175 and 176 are shown connected to brushes 173 and 174 which contact slip rings 171 and 172 of alternator 170. Lead 175 connects to regulator terminal 177. This side of the circuit passes through reactor 110 and the secondaries of the following transformers 10, 20, 30, 40a, 40b, 50a, 50b, 60a, 60b, 120a, 120b, 120c and to terminal 178. Terminal 178 connects to feeder circuit wire 179. Wire 176 constitutes the other side of the circuit and runs through to the utilization equipment. Shunt wire 113 connects wire 176 to shunt terminal 180 of the regulator.

The operation of this device is as follows.

Assume handle 221 (Fig. 1) is thrown so as to close contacts 152 and 151 of switch 150, contacts 157 and 156 of switch 155, and contacts 162 and 161 of switch 160. Assume also that nut 217 is at the top of its travel against stop plate 225. In this position switches 13, 23, 33, 43, 53, and 63 are all thrown into the upper position so as to close against contacts 14, 24, 34, 44, 54, and 64 respectively; thus short circuiting primary windings 10P, 20P, 30P, 40P, 50P, and 60P respectively. It is thus seen that these buck and boost transformers 10 to 60 respectively are in a neutral condition. On the other hand, the transformers 120a, 120b, and 120c have their primaries connected in multiple across the busses 127 and 128. 127 is connected solidly to the terminal lead 179. 128 is connected to the opposite pole of the circuit, i. e. wire 176 by the jumpers 128 and 113. These three transformers are so connected that their secondaries are connected in series to continuously boost the voltage of the source (alternator 170) a fixed amount, say three percent.

If now, handwheel 208 is turned to screw nut 217 downwards, lug 218 turning with hub 216 immediately engages the handle 223 of snap switch 13 so that it flips over making connection between the hinge contact 15 and the stationary contact 16. This action takes place in the shortest possible time by reason of the high speed action of snap switch 13. The primary of transformer 10 is now connected across the power circuit by the following connections. Wire 176 through 113 to shunt terminal 180, jumper 112 to contact 161 of switch 160, switch 160 to wire 113, jumper 11 to primary 10P, primary 10P through wire 12 to contact 15, contact 15 through switch 13 to contact 16, contact 16 through wire 115 to contact 157 of switch 155, through switch 155 to upper contact 156 and then through wire 11 and reactor 110 to regulator terminal 177 which connects to wire 175.

If wheel 208 is continuously turned, hub 216 and lug 218 will continue to revolve together about shaft 207. As it travels downward it will contact successively the operating handles of snap switches 23, 33, 43, 53, and 63 respectively, closing these switches in the downward position (see Fig. 2). When these switches are in the downward position, the primaries of all the transformers are in multiple across the power circuit and transformers 10 to 60 respectively are connected to boost the voltage across wires 175 and 176. For convenience in manufacturing, all the transformers are identical. It will therefore be seen that with nut 217 in its highest position against stop 225, the three transformers 120a, 120b, and 120c will each boost the voltage an equal amount, say 1%, so that the total boost will initially amount to 3%, i. e. the voltage across the outgoing wires 176 and 179 will be approximately 3% higher than the voltage on the power source 175, 176. Now as switch 13 is snapped to its lower position, (see Fig. 2) by the downward travel of hub 216 and lug 218, primary 10P is thrown from a short circuited or no voltage position to a full voltage position across the power source, so that transformer 10 immediately adds 1% boost, making the total voltage on outgoing wires 176, 179 approximately 4% higher than the power source 175, 176. In the same manner, when switch 23 is snapped to the lower position, transformer primary 20P is thrown from a short circuited condition to a full voltage condition, making the total boost 5%. And when switch 33 is snapped to the down position transformer 30 is similarly energized and adds a 1% boost, making the total boost 6%. When switch 43 is snapped down the primaries of both of the transformers 40a and 40b are thrown from a short circuited to a full voltage position, and since their secondaries are in series they each add a 1% boost, or a total of 2%, making the total boost of the regulator 8%. Similarly when switch 53 is snapped down transformer 50a and 50b each add 1% boost making the total boost 10%, and when switch 63 is snapped (Fig. 2) to the down position the total boost becomes 12%.

When each of these switches, as for instance 13 is thrown down, the corresponding primary winding, as for instance 10P, is momentarily open circuited, and since the inductively associated secondary 10S may be carrying full load current, it follows that the associated primary 10P must also carry substantially full load current or otherwise the current in the primary would act as a magnetizing current and almost instantly build up an excessively high voltage across the primary 10P. I have provided a condenser in shunt across each transformer primary circuit as 18 across 10P; 28 across 20P; 38 across 30P etc. The function of each condenser is to carry the primary current during the switching period and it will be evident to one skilled in the art that the shorter the switching time, the smaller will be the condenser required for this purpose. It is important to note that when the transformer snap switches as for instance 13, 23, etc. are in the short circuiting position, i. e. up (Fig. 2) then the capacitors 18, 28, etc. are completely discharged and are therefore prepared to absorb the primary current; also when in the "across the line" position, i. e. switch 13 down (Fig. 2) they are fully charged at the instant of maximum voltage and current and are therefore in prime condition to furnish the associated transformer primary with the necessary current.

It will of course be noted that when switching a transformer primary from a buck to a neutral position, the condenser will be charged at the peak of the wave and if the feeder is carrying a high power factor load the associated transformer primary will charge it still further during the switching interval. Since operation in the buck position is always at light load this condition will not materially increase the size of condenser required.

It will be noted that by using many transformer banks, each separately switched, the current to be switched is kept at a very small value.

I have also shown across each transformer primary a lightning arrester as for instance 17 for transformer 10; 27 for transformer 20; 37 for transformer 30, etc. This lightning arrester serves its usual function to protect the transformer against high voltage during current surges while switching.

It will be noted that switches 155 and 160 as well as switch 150 are thrown in the up position for boost. Assuming again that nut 217 is in its topmost position against the stop bracket 225 with switches 150, 155, and 160 thrown in the down position (Fig. 2) a downward travel of nut 217 will again operate switches 13 to 63, throwing them from the up position to the down position (Fig. 2). This will again energize transformers 10 to 60 respectively but in the reverse direction, i. e. each transformer as it is energized will add a 1% buck instead of boost. When switch 13 is snapped down energizing transformer 10, the 3% boost produced by the transformers 120a, 120b and 120c will be reduced to a 2% boost. When switch 23 is snapped down energizing transformer 20 the boost will be reduced to 1% and when switch 33 is snapped down the boost will be reduced to zero, that is, the voltage regulator will be in the neutral position. When switch 43 is snapped down and transformers 40a and 40b are energized, a 2% buck will be produced and when transformers 50a and 50b and 60a and 60b are energized by snapping down switches 53 and 63 the maximum buck of 6% will be obtained. It will be noted that when switches 150, 155 and 160 are thrown in the up position, a relatively large capacitor bank 130, 130 (Fig. 2, see also Fig. 3) is connected directly in multiple with the primaries of 60a and 60b. Also that when switches 150, 155 and 160 are thrown down, that is in the buck position, the capacitor banks 130, 130 are disconnected, and a reactor 140 (see Fig. 2 and Fig. 3) is connected directly in multiple with the primaries of 60a and 60b. It follows therefore, that when switches 150, 155 and 160 are in the boost position, the capacitor bank 130, 130 is energized when the last boost position is reached, and when switches 150, 155 and 160 are thrown to the buck position a reactor 140 is energized at the instant the maximum buck position is reached, i. e. when transformers 60a and 60b are energized.

It is to be understood that in practice the switch 150 may have a plurality of poles and the capacitor bank 130, 130 may be divided up into a corresponding plurality of capacitors, each capacitor being connected across one of the transformer banks, as for instance 10, 20, 30, 40, 50, 60 so that capacitors are added in shunt across the feeder in accordance with the amount of boost, and the amount of capacity in the several groups may be altered to suit the requirements of the circuit. That is, a feeder carrying a motor load of low power factor with a lighting peak of unity power factor will have the capacitors distributed across the primaries of those transformers which are first cut in the circuit. On the other hand, a feeder carrying a steady load of high power factor with an occasional motor load (as for instance a large pump of low power factor) will have the capacitors distributed across the primaries of the last transformer to be cut in circuit.

The reactor 110, Fig. 1 and Fig. 2, is connected in the circuit before the lead 111 is tapped off. It follows therefore that a short circuit on feeder wires 176, 179 will draw a very large current which will be limited by the impedance of reactor 110, so that there will be a high voltage across reactor 110 and a very low voltage across wires 111 and 112. It follows therefore, that if switches 13, 23 to 63 inclusive operate during the instant of the short circuit they will be handling a relatively high current, but a relatively low voltage.

As many changes could be made in the above construction and many apparently widely different embodiments of this invention could be made thereof, it is intended that all matter contained in the above description or shown in the accompanying drawings shall be interpreted as illustrative and not in a limiting sense.

What is claimed is:

1. A voltage regulator provided with racks, a plurality of substantially identical and interchangeable voltage regulating units mounted on said racks, each of said units consisting of a transformer means and a switch connected to said transformer means and arranged to throw its connected transformer means into and out of regulating condition, whereby units may be added in sequence to increase the regulating range of said regulator and extracted in the reverse sequence to diminish said regulating range.

2. A voltage regulator tank and transformer means with secondaries connected in series relation to boost the voltage of a power circuit, and primaries connected in shunt relation located in said tank, and switch means connected to vary the amount of boost voltage in said power circuit located in said tank, and a reactor in said regulator tank, said reactor permanently connected in series between said voltage regulator and said power source whereby an excessive current in said power circuit greatly reduces the shunt voltage across both said transformer primaries and said switch means whereby said switch means is required to switch normal currents at normal voltage and excessive currents at a correspondingly low voltage.

3. A voltage regulator adapted to be connected to a power circuit comprising a plurality of relatively small transformer units disposed consecutively in a tank and having secondaries permanently connected in series relation with each other and arranged to be connected in series with said power circuit for voltage regulation of said circuit; a corresponding plurality of such switch units and a manually operated finger member movable along a helical path and disposed for actuating said snap switch units, each of said switch units being individually connected to switch the primary of a respective one of said relatively small transformer units into and out of shunt relation with said power circuit, the current required to be switched by each switch unit being small by reason of the number of units and inversely proportional to the number of units used for a definite voltage regulation on said power circuit.

4. A voltage regulator adapted to regulate the voltage of a power circuit comprising a plurality of transformers having secondaries connected in series relation in said power circuit and having primaries connected to be switched successively from a short circuited position to a shunt position across said power circuit, and a plurality of reactor means, and a plurality of capacitor means, and switch means connected to switch a said capacitor in shunt with a said transformer primary when said regulator is in boost position and to switch a said reactor in shunt with a said transformer primary when said regulator is in buck position.

5. A voltage regulator provided with racks, a plurality of substantially identical and interchangeable voltage regulating units mounted on said racks, each of said units consisting of a transformer means and a switch connected to said transformer means and arranged to throw its connected transformer means into and out of regulator condition, whereby units may be added in sequence to increase the regulating range of said regulator and subtracted in the reverse sequence to diminish said regulating range, and additional switch means arranged to be connected in one position to cause said regulating units to boost said power circuit and arranged to be connected in reverse position to cause said units to buck said power circuit.

6. A voltage regulator provided with racks, a plurality of substantially identical and interchangeable voltage regulating units mounted on said racks, each of said units consisting of a transformer means and a switch connected to said transformer means and arranged to throw its connected transformer means into and out of regulator condition, whereby units may be added in sequence to increase the regulating range of said regulator and subtracted in the reverse sequence to diminish said regulating range, additional switch means arranged to be connected in one position to cause said regulating units to boost said power circuit and arranged to be connected in reverse position to cause said units to buck said power circuit, and additional transformer means permanently connected to said power circuit and providing a fixed voltage regulation for combination with a variable output of said voltage regulating units.

FRAZER W. GAY.